March 2, 1971     E. W. RADTKE     3,567,179

BUTTERFLY VALVE SEALING MEANS WITH INTERLOCKING MECHANISM

Filed March 3, 1969

INVENTOR
EDWARD W. RADTKE

BY *Lawrence A. Savage*

AGENT

United States Patent Office 3,567,179
Patented Mar. 2, 1971

3,567,179
BUTTERFLY VALVE SEALING MEANS WITH INTERLOCKING MECHANISM
Edward W. Radtke, Bloomfield, Conn., assignor to United Aircraft Corporation, East Hartford, Conn.
Filed Mar. 3, 1969, Ser. No. 803,538
Int. Cl. F16k 1/22; F16j 9/24
U.S. Cl. 251—306      5 Claims

ABSTRACT OF THE DISCLOSURE

An improved butterfly seal is provided by the combination of a split ring or piston ring type seal disposed in the groove around the periphery of a butterfly disc, the ring preferably having means for interlocking its ends, and a pin disposed radially in the disc periphery and protruding outwardly from the groove and into the interlocking means of the ring or into a space between the ends of the ring or into a space in the ring to prevent rotation of the ring in the disc groove.

BACKGROUND OF THE INVENTION

Field of the invention

This invention relates to butterfly valves and particularly to means for sealing the butterfly.

Description of the prior art

One of the long standing problems associated with the use of a piston ring for sealing the butterfly disc of a butterfly valve with the valve bore in which the disc is disposed is that the duct pressure tends to push the ring out of its groove in the disc when the valve is open, and thus cause the ring to jam between the butterfly disc and the valve bore when the valve closes, thereby preventing complete closing of the valve. Many attempts have been made to solve this problem, but heretofore none of the solutions has proved entirely successful. For example, a piston ring having interlocked ends is known, and while the interlocking ends have improved the situation somewhat, it is still possible in certain orientations of the ring for the ring to be pushed out of its groove. My invention prevents the piston ring from moving out of the groove.

SUMMARY OF THE INVENTION

The object of the present invention is to provide a piston ring type seal for the disc of a butterfly valve in which the ring is prevented from rotating around in the groove of the butterfly disc periphery, and, therefore, from sliding out of the groove.

Another object of the present invention is to provide a butterfly seal of the piston ring type in which the means for preventing rotation of the ring is trapped between the wall of the valve bore and the butterfly disc.

In accordance with the present invention an improved butterfly valve disc seal is provided by the combination of a split ring disposed in a groove around the butterfly disc periphery, the ends of the ring preferably having means for interlocking, and a pin disposed in the butterfly disc groove and protruding into a space therefor in the ring or in the interlocking means. The split ring is thereby prevented from the rotating in the disc groove and, therefore, prevented from sliding out of the groove.

In further accord with the present invention the pin is disposed radially in the disc groove and the pin and the ring ends are disposed near the disc shaft, the disc shaft being canted in relation to a perpendicular to the cylindrical axis of the valve bore so that the pin is trapped between the disc and the valve bore wall at all positions of the valve disc, from full open to full closed.

The foregoing and other objects, features and advantages of the present invention will become more apparent in light of the following detailed description of a preferred embodiment thereof, as illustrated in the accompanying drawings.

DESCRIPTION OF THE PREFERRED EMBODIMENT

Figure 1:
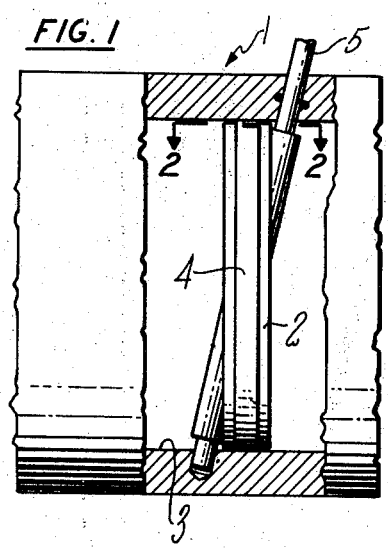
FIG. 1 is a sectioned elevation of a butterfly valve.

Referring to FIG. 1, there is shown generally a butterfly valve 1 disposed in a valve bore 3. The butterfly valve 1 is comprised of a butterfly disc 2 mounted for rotation on a shaft 5 which is canted in relation to a perpendicular to the axis of the valve bore. The butterfly disc 2 has a split ring (or piston ring) 4 disposed in a groove 6 around the periphery of the disc 2. The ends of the split ring 4 may be plain, as shown in FIG. 4, or may have means for interlocking such as a terminus 8 on one end of the ring and a notch 10 spaced therefrom by a reduced width portion 12 as shown in FIG. 2; the other end of the ring has a terminus 14 and a notch 16 spaced therefrom by a reduced width portion 18.

Figure 2:
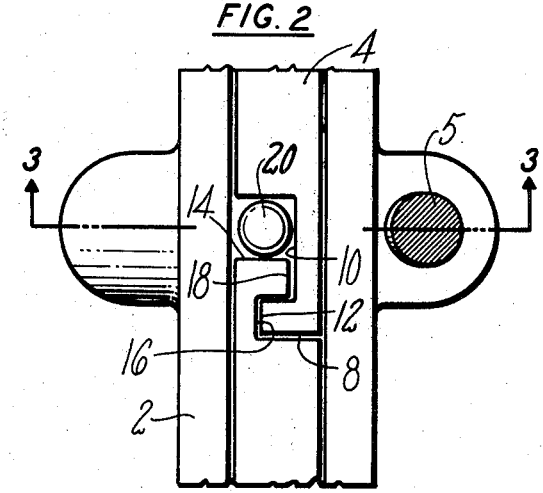
FIG. 2 is a partial plan view of the valve taken along line 2—2 in FIG. 1 showing a butterfly seal in accordance with my invention.
Figure 3:
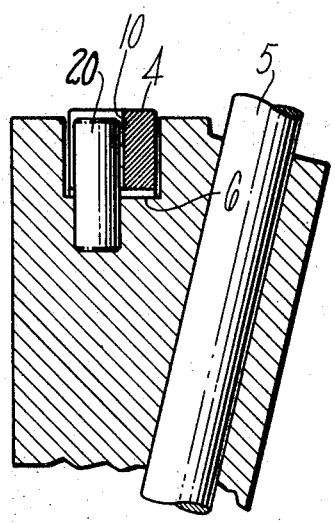
FIG. 3 is a section view taken along line 3—3 of FIG. 2.

In the embodiment shown in FIG. 2 and FIG. 3, the notch 10 forms a seat for the reduced width portion 18, and the notch 16 forms a seat for the reduced width portion 12. At least one of the notches 10 or 16 should be long enough to provide space for a pin 20 in addition to the reduced width portion which it seats. The pin 20 is radially disposed in the periphery of the disc 2 and protrudes radially outwardly into either the notch 10 or the notch 16 (whichever has been made long enough to accommodate the pin). It will be seen that the pin 20 prevents the split ring 4 from rotating around the groove 6 in the disc 2.

Figure 4:
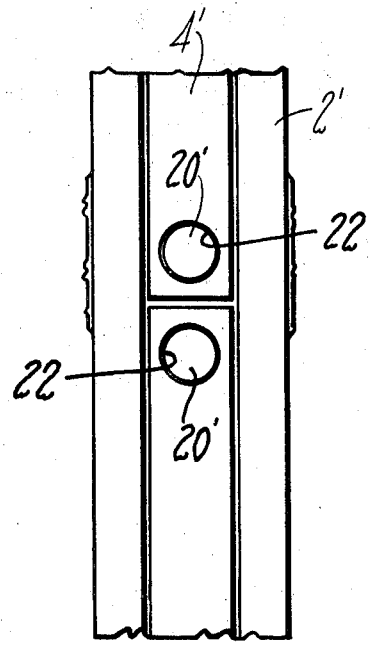
FIG. 4 is a partial plan view of the valve taken along line 2—2 of FIG. 1 showing another embodiment of my invention.

In the embodiment shown in FIG. 4, two pins 20' are radially disposed in the periphery of the disc 2' and protrude radially into holes 22 drilled in the split ring 4'.

There has thus been described a preferred embodiment of a butterfly sealing means in accordance with the present invention. While I have shown a particular type of split ring interlocking means, it should be understood by those skilled in the art that many types of interlocking may be used, or none need be used at all as shown in FIG. 4. Therefore, it should be understood by those skilled in the art that various changes and omissions in the form and detail thereof may be made without departing from the spirit and scope of the invention which is to be limited only as set forth in the following claims.

I claim:
1. In a butterfly valve having a butterffy disc supported for rotation in the valve bore by a shaft canted with respect to a perpendicular to the valve bore axis, means for sealing the butterfly disc with the valve bore, comprising:
    a split ring disposed in a groove in the periphery of the butterfly disc; and
    a pin radially disposed in the periphery of the butterfly disc and protruding therefrom adjacent an end of said split ring, said pin and the ends of said split ring being disposed near the canted shaft so that the ends of said split ring and said pin are trapped between the butterfly valve disc and the wall means of the valve bore thereby preventing rotation of said split ring in the groove.

2. In a butterfly valve having a butterfly disc supported for rotation in the valve bore by a shaft canted with respect to a perpendicular to the valve bore axis, means for sealing the butterfly disc with the valve bore as recited in claim 1, additionally wherein said pin protrudes into a space therefor in said split ring.

3. In a butterfly valve having a butterfly disc supported for rotation in the valve bore by a shaft canted with respect to a perpendicular to the valve bore axis, means for sealing the butterfly disc with the valve bore as recited in claim 1, additionally wherein said pin protrudes into a space therefor between the ends of said split ring.

4. In a butterfly valve having a butterfly disc supported for rotation in the valve bore by a shaft canted with respect to a perpendicular to the valve bore axis, means for sealing the butterfly disc with the valve bore as recited in claim 1, additionally wherein said split ring has ends with means for interlocking with each other, said interlocking means having a space therein for a pin, and said pin protrudes into said space in said interlocking means.

5. Means for sealing the butterfly disc with the valve bore as recited in claim 4 wherein said interlocking means comprises:
- a first ring end having a terminus and a notch spaced therefrom by a reduced width portion; and
- a second ring end having a terminus and a notch spaced therefrom by a reduced width portion, said notch being of greater length than the notch in said first ring end, whereby said notch in said first ring end provides a seat for said reduced width portion of said second ring end, and said notch in said second ring end provides a seat for said reduced width portion of said first ring end and also provides a space into which said pin may protrude.

References Cited

UNITED STATES PATENTS

| | | | |
|---|---|---|---|
| 1,489,464 | 4/1924 | Small | 277—220X |
| 1,535,552 | 4/1925 | Small | 277—136 |
| 1,671,069 | 5/1928 | De Wein | 251—305X |
| 2,006,972 | 7/1935 | Vincent et al. | 277—136X |
| 2,058,996 | 10/1936 | Kollberg | 251—306 |
| 2,840,338 | 6/1958 | Shaw | 251—306 |
| 2,843,353 | 7/1958 | Marden | 251—306X |

FOREIGN PATENTS

| | | | |
|---|---|---|---|
| 584,404 | 9/1933 | Germany | 277—136 |

HENRY T. KLINKSIEK, Primary Examiner

U.S. Cl. X.R.

277—137, 220